(12) United States Patent
Ohno

(10) Patent No.: US 8,530,033 B2
(45) Date of Patent: Sep. 10, 2013

(54) EXTERNAL WALL PANEL AND METHOD OF COATING FOR THE SAME

(75) Inventor: Syouzou Ohno, Nagoya (JP)

(73) Assignee: Nichiha Corporation, Nagoya-Shi (JP)

( * ) Notice: Subject to any disclaimer, the term of this patent is extended or adjusted under 35 U.S.C. 154(b) by 500 days.

(21) Appl. No.: 12/213,210

(22) Filed: Jun. 16, 2008

(65) Prior Publication Data

US 2008/0311346 A1    Dec. 18, 2008

(30) Foreign Application Priority Data

Jun. 18, 2007    (JP) .................................. 2007-160650

(51) Int. Cl.

| | |
|---|---|
| *D06N 7/00* | (2006.01) |
| *D06N 7/04* | (2006.01) |
| *G11B 5/64* | (2006.01) |
| *E01F 9/04* | (2006.01) |
| *E04D 7/00* | (2006.01) |
| *B32B 5/00* | (2006.01) |
| *B32B 7/00* | (2006.01) |
| *B32B 3/00* | (2006.01) |
| *B32B 3/30* | (2006.01) |
| *B05D 1/36* | (2006.01) |
| *B05D 5/00* | (2006.01) |

(52) U.S. Cl.
USPC ............. 428/142; 428/98; 428/141; 428/143; 428/144; 428/145; 428/601; 427/152; 427/258; 427/273; 52/516; 52/518; 52/473

(58) Field of Classification Search
USPC ........... 428/98, 141, 142, 143, 601; 427/152, 427/258, 273; 52/518, 516, 473
See application file for complete search history.

(56) References Cited

U.S. PATENT DOCUMENTS

| 2,879,171 | A | | 3/1959 | Kullenberg | |
|---|---|---|---|---|---|
| 2,997,403 | A | | 8/1961 | Searight | |
| 4,267,221 | A | * | 5/1981 | Ishikawa ........................ | 428/121 |
| 4,491,616 | A | * | 1/1985 | Schmidle et al. ............. | 428/158 |
| 4,608,294 | A | * | 8/1986 | Courtoy et al. ............... | 428/141 |
| 4,617,222 | A | * | 10/1986 | Courtoy et al. ............... | 428/142 |
| 4,849,265 | A | * | 7/1989 | Ueda et al. ................... | 428/40.4 |
| 4,863,782 | A | * | 9/1989 | Wang et al. ................... | 428/204 |
| 5,035,920 | A | | 7/1991 | Smrt et al. | |
| 5,169,558 | A | | 12/1992 | Smrt et al. | |

(Continued)

FOREIGN PATENT DOCUMENTS

| EP | 0 297 186 A1 | 1/1989 |
|---|---|---|
| EP | 1 985 671 A1 | 10/2008 |

(Continued)

*Primary Examiner* — Maria Veronica Ewald
*Assistant Examiner* — Nathan Van Sell
(74) *Attorney, Agent, or Firm* — Birch, Stewart, Kolasch & Birch, LLP

(57) ABSTRACT

The present invention relates to an external wall panel which is excellent in ornamental design and weather resistance and a coating method for the external wall panel. An external wall panel of the invention comprises a base panel having a three-dimensional ornamental design surface, a lower coating layer formed on the surface of the base panel, a mid-coating layer formed on the lower coating layer, a first clear layer containing beads formed on the mid-coating layer, and a second clear layer made of a transparent layer or semi-transparent layer formed on the first clear layer wherein the second clear layer has a thick film layer portion in the vicinity of a corner edge of a convex portion of the three-dimensional ornamental design surface.

7 Claims, 4 Drawing Sheets

(56) References Cited

U.S. PATENT DOCUMENTS

| | | |
|---|---|---|
| 5,736,602 A | 4/1998 | Crocker et al. |
| 2004/0086678 A1* | 5/2004 | Chen et al. .................... 428/44 |
| 2005/0069681 A1* | 3/2005 | Wright et al. ................ 428/172 |
| 2007/0110981 A1 | 5/2007 | Killilea et al. |

FOREIGN PATENT DOCUMENTS

| | | |
|---|---|---|
| JP | 2000-302570 | 10/2000 |
| JP | 2000302570 A * | 10/2000 |
| JP | 2001-121523 | 5/2001 |
| JP | 2006-264036 | 10/2006 |
| WO | WO-2006/056644 A1 | 6/2006 |

* cited by examiner

EXTERNAL WALL PANEL AND METHOD OF COATING FOR THE SAME

This non-provisional application claims priority under 35 U.S.C. §119(a) on Japanese Patent Application No. 2007-160650 filed on Jun. 18, 2007, which is herein incorporated by reference.

FIELD OF THE INVENTION

The present invention relates to an external wall panel having a three-dimensional ornamental design surface with a convex portion and a concave portion and a method of coating for the external wall panel.

DESCRIPTION OF RELATED ART

An external wall panel with an ornamental design surface having a convex portion and a concave portion has been commonly used as a residential external wall panel. Recently, it has become popular to use a ceramic-based external wall panel with a three-dimensional ornamental design of a block pattern, a tile pattern or a complicated pattern that resembles natural stone.

Such an external wall panel is normally manufactured by a dry sheet-making process or wet sheet-making process. When an embossed three-dimensional pattern with sharp edges is formed on the surface of a base panel by a high-pressure press, cracks, hairline cracks, blowholes and pinholes are often formed in the vicinity of a corner edge area or deeply bent portion of a convex portion as shown by 7 in FIG. 1A, where the surface is sharply bent, because of stress concentration caused by the press. In order to avoid such defects, using a high-pressure press for a short time has been proposed. However, in reality it is not easy to carry out such a technique since high-pressure presses are very expensive. (See JP2001-121523A)

As to coating of an external wall panel, it is known to use a method where a variety of decorations are provided by spray-coating or ink-jet coating in addition to lower layer coating, mid-layer coating and upper layer coating, and a clear layer is coated on top thereof. Also proposed is a method where beads are mixed into a mid-layer to improve weather resistance, and a clear layer is coated over the top surface. (See JP2000-302570A)

For a more ornamental design, a method has been proposed which includes the following steps: forming a printed colored clear layer in addition to a lower layer coating, mid-layer coating and upper layer coating, printing a convex portion formed between joints with a pearl clear layer containing a scale-like aggregate, and then forming an overall glossy clear layer by spraying. This method provides a more natural and more three-dimensional appearance by providing a color difference between the joint portion and the surface of the convex portion. (See JP2006-264036A)

Usually a clear layer is formed all over the ornamental design surface of the panel to improve the weather resistance of the external wall panel. However, a simple clear layer tends to provide an appearance which is too glossy all over the ornamental design surface. Also, a clear layer containing beads provides a matte appearance all over the panel, in other words, the joint portion and the ornamentally designed portion look the same, which makes the panel look monotonous.

Generally, a corner edge area and the vicinity (including a slope area) is the most brittle portion in terms of strength of the panel. When coating an external wall panel with a three-dimensional surface, an expected coating thickness can be obtained in the flat area of both the convex portion and concave portion (joint bottom) of the three-dimensional surface, but cannot be obtained in the vicinity of a corner edge area of the convex portion since the coated material runs down the slope, which reduces the coating thickness on the slope. Consequently cracks, hair cracks, blowholes, pinholes and the like tend to be caused in the slope of the corner edge area even after the coating is made.

BRIEF SUMMARY OF THE INVENTION

An objective of the present invention is to provide an external wall panel which is excellent in ornamental design and weather resistance and a coating method for the external wall panel. The coating method is capable of providing a stable coating in the vicinity (including a slope area) of a corner edge area of a convex portion even if the area has cracks, hair cracks, blowholes and/or pinholes. The external wall panel has a joint portion which has an excellent weather resistance and a matte appearance and looks glossy in the vicinity (including a slope area) of a corner edge area of the convex portion where cracks, hair cracks, blowholes and/or pinholes tend to be caused.

To establish the above objective, the invention is directed to an external wall panel comprising a base panel having a three dimensional ornamental design surface, a lower coating layer formed on the surface of the base panel, a mid-coating layer formed on the lower coating layer, a first clear layer containing beads formed on the mid-coating layer, and a second clear layer made of a transparent layer or semi-transparent layer formed on the first clear layer wherein the second clear layer has a thick film layer portion in the vicinity of a corner edge of a convex portion of the three dimensional ornamental design surface.

One of the features of the invention is that the panel has a first clear layer containing beads formed on the three-dimensional surface having a lower coating layer and a mid-coating layer and further has a second clear layer made of a transparent layer or semi-transparent layer formed on the first clear layer, the second clear layer having a thick film layer portion in the vicinity of a corner edge of a convex portion.

The clear layer containing beads coated over the three-dimensional surface can easily enter the cracks, hairline cracks, blowholes and/or pinholes, and tends to be caught on the surface due to the beads and also tends to stay in the vicinity of a corner edge area of the convex portion because of a friction increase caused by the beads. The clear layer made of a transparent layer or semi-transparent layer can provide a glossy appearance. Also, a thicker coated film can be formed in the vicinity of a corner edge area, that is, protecting the film at the most brittle portion, because of cracks, hairline cracks, blowholes and/or pinholes, which leads to increased weather resistance.

Further, a clear layer containing beads is formed all over the three-dimensional surface, which provides a joint portion with a low color saturation of a matte and rough textured surface, and a thick film layer portion of a clear layer made of a transparent layer or semi-transparent layer formed over the slope in the vicinity of the corner edge of a convex portion, which provides a high color saturation of a mirror finish. Thus, two adjacent portions have different color saturation from each other, which provides an appearance with good contrast. As a result, the external wall panel is provided with a clearly visible color difference and texture difference in the whole appearance, which leads to an improvement of the ornamental design of the panel having a good three-dimensional appearance without having any other special coating.

Accordingly, the present invention first provides a protecting film having excellent weather resistance over a slope in the vicinity of the corner edge where cracks, hairline cracks, blowholes and pinholes tend to form easily, with good production efficiency, and second to make the slope in the vicinity of the corner edge of the convex portion look glossy and the joint portion to look matte, which leads to greatly improving the ornamental design through a clearly visible color difference and texture difference.

As described in the present disclosure, an inclination angle of a slope toward a concave portion in the vicinity of an edge of the convex portion is preferably 30 degrees or more. If the angle is less than 30 degrees, the formation of cracks, hairline cracks, blowholes and pinholes is basically suppressed, but as the angle reaches 30 degrees or more, the formation is amplified since stress concentration is caused by the press. Therefore, an angle of 30 degrees or more is preferable and as the angle increases, the color difference and color saturation difference become more clearly visible.

The thickness of the thick film layer portion of the second clear layer is preferably 10 μm or more. This allows the clear layer made of a transparent layer or semi-transparent layer to be more securely adhered to the clear layer containing beads formed over the three-dimensional surface, which more securely prevents disadvantages caused by cracks, hairline cracks, blowholes and pinholes.

Further, the invention described herein comprises a method of coating for an external wall panel comprising the steps of forming a lower coating layer on a base panel having a three dimensional ornamental design surface, forming a mid-coating layer on the lower coating layer, forming a first clear layer containing beads on the mid-coating layer, and forming a second clear layer made of a transparent layer or semi-transparent layer on the first clear layer in the vicinity of a corner edge of a convex portion of the three dimensional ornamental design surface.

An effect brought about by the coating method of the present invention is described below. A clear layer containing beads is coated over the three dimensional ornamental design surface of an external wall panel, which provides the clear layer with a fine bumpy surface because of the beads exposed to the surface. Further, when the thick film layer portion made of a transparent layer or semi-transparent layer is formed thereon in the vicinity of the corner edge of a convex portion, disadvantages caused by the cracks, hairline cracks, blowholes and pinholes in a slope area in the vicinity of a corner edge can be prevented by the clear coating. Because of this factor, a coated film with good weather resistance can be formed in good production efficiency.

As described before, the slope area in the vicinity of the corner edge area of a convex portion is glossy in appearance and high in color saturation, while the joint portion is matte in appearance and low in color saturation. Thus, the slope area and the joint portion have a clearly visible difference in color saturation, which provides an external wall panel with good contrast and good three-dimensional appearance.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

Figure 1A:
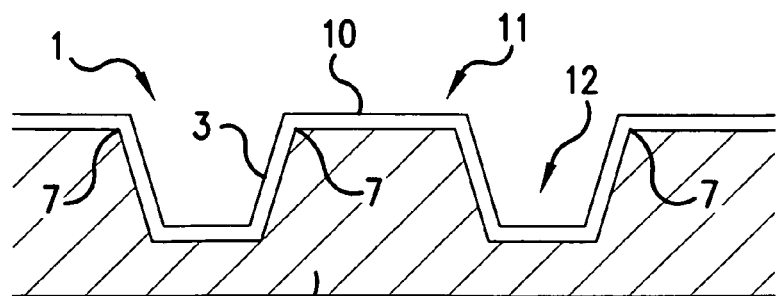
FIGS. 1A, 1B, 1C and 1D are schematic diagrams showing sectional views of a structure of coated film on an external wall panel of the present invention.
Figure 1B:
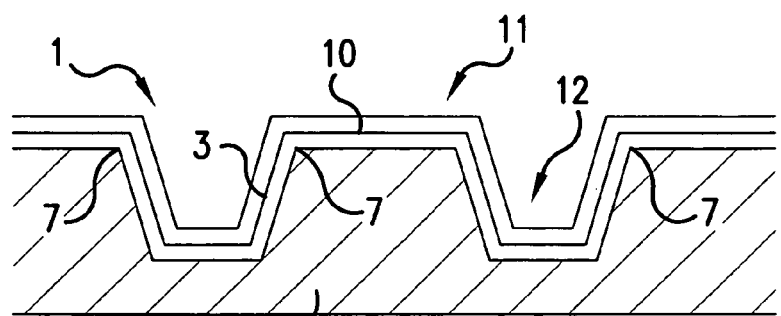
Figure 1C:
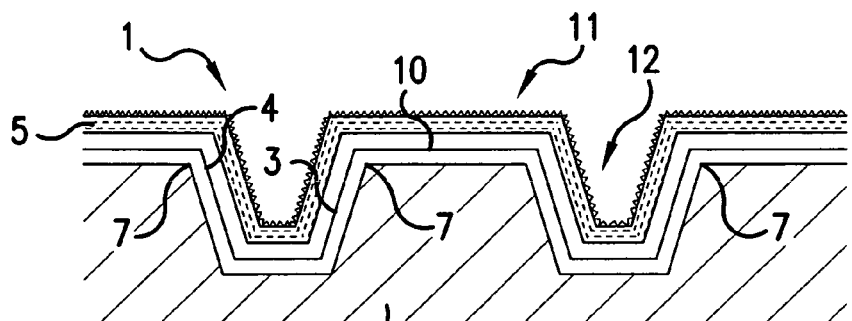
Figure 1D:
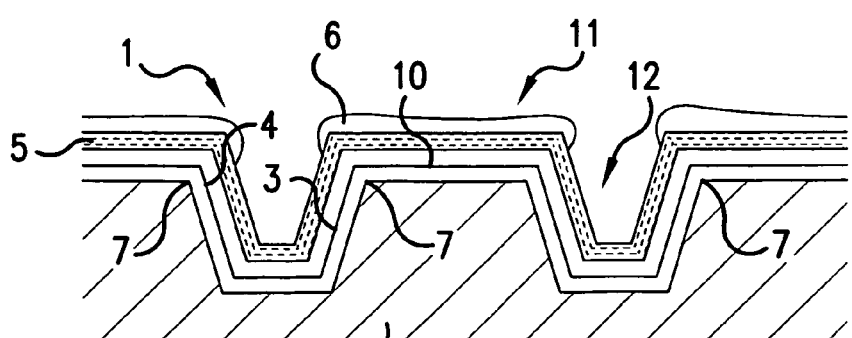
Figure 2:
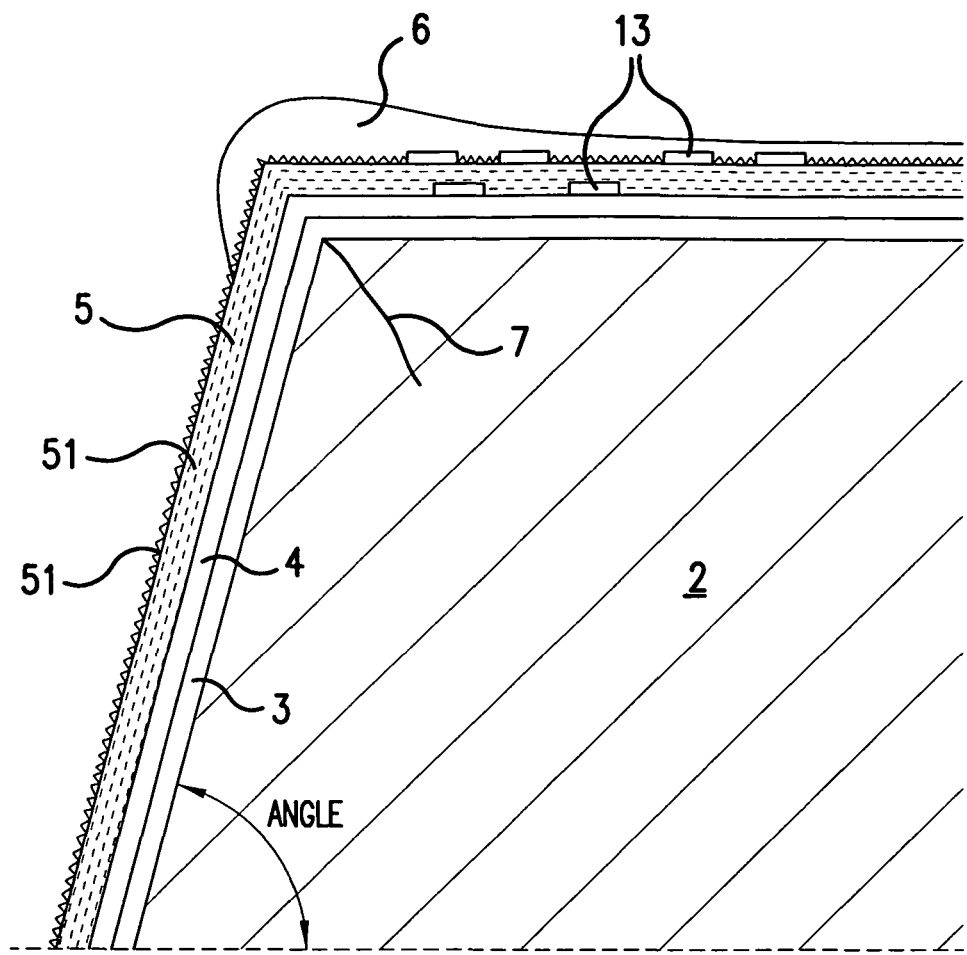
FIG. 2 is a schematic diagram showing an enlarged sectional view of a structure of coated film in the vicinity of the corner edge of a convex portion shown in the center of FIG. 1D.

One embodiment of an external wall panel of the present invention is more specifically explained in the following description with reference to the appended Figures. FIGS. 1A, 1B, 1C and 1D show sectional views of a structure of coated film on an external wall panel of the present invention. FIG. 2 is an enlarged sectional view of a structure of coated film in the vicinity of the corner edge of a convex portion shown in the center of FIG. 1D. As shown in FIG. 1D, a coating surface 10 of a base panel of an external wall panel 1 has a lower coating layer 3, a mid-coating layer 4, a first clear layer 5 and a second clear layer 6 thereon and has a convex portion 11 with a corner edge area and a concave portion 12 located between the convex portions.

[Base panel] A base panel 2 of an external wall panel 1 of the present invention is, for example, a wood cement board which is a cement board containing a wood reinforcing material such as wood chips, wood pulp or wood fiber, an extrusion molding cement board, a pulp cement board, a gypsum board, a calcium silicate board, a magnesium carbonate board or a cement board. As to a convex portion and a concave portion of the present invention, a convex portion is defined as an upper part of a shape shown in the center of FIG. 1D, i.e., a part above the mid-point of the slope of the shape; and a concave portion is defined as a groove portion located below the mid-point of the slope. The inclination angle of a slope is defined as an angle between the horizontal plane including a bottom of the concave portion and the slope plane as shown in FIG. 2.

[Coating] On the surface of the base panel 2, a multiple layer coating is made by applying a lower layer coating, a mid-layer coating, an upper layer coating and a clear layer coating in this order. For these layers, although it is preferable to use an aqueous emulsion type coating material such as an acrylic resin aqueous emulsion type coating material or silicon-acrylic resin aqueous emulsion type coating material, a solvent type coating material such as an acrylic resin clear solvent type or a combination of an aqueous emulsion type and a solvent type can be used. As to a clear coating material, a transparent coating material and a semi-transparent coating material containing some amount of pigment or dye can be employed. Coating materials of a first clear layer 5 and a second clear layer 6 are preferably the same kind of coating material so as to be good in adherence, layer stability and workability. A further ornamental design can be added by providing an ink layer 13 between a mid-coating layer and an upper coating layer (a first clear layer) and/or between a first clear layer 5 and a second clear layer 6 as shown in FIG. 2 by ink-jet printing, gravure printing or offset printing.

[Beads] Beads are preferably contained in the first clear layer in an amount of 5-20 weight %. This makes it possible to have the transparent or semi-transparent second clear layer 6 securely coated on the first clear layer 5, which can prevent defects more securely regarding weather resistance. When the content of beads is less than 5%, the effects of the invention are not sufficient. When the content of beads exceeds 20 weight %, a stable coating may not be obtained because the coating liquid of the first clear layer 5 can not be stably stocked because of the viscosity, thixotropy, and/or precipitation of the beads. Beads 51 are 50-150 μm in diameter, transparent and colorless or having a light color of the same kind of color of the convex portion or of an opposite color. Beads 51 are spherical or flat in shape, containing methyl methacrylate polymer or acrylonitrile, glass grains, talc and/or calcium carbonate as a primary component.

EXAMPLE 1

First, a base panel 2 having the above-mentioned three-dimensional ornamental surface is prepared. Second, a lower coating layer 3 is formed on the base panel 2 by spraying a coating material of the lower coating layer (sealer) all over the base panel as shown in FIG. 1A. Third, a mid-coating layer 4 is formed on the lower coating layer 3 by spraying a coating material of the mid-coating layer all over the lower coating layer as shown in FIG. 1B. Fourth, a first clear layer 5 where a large amount of beads are scattered is formed on the mid-coating layer 4 by spraying a clear coating material of the first clear layer containing a large amount of beads all over the mid-coating layer as shown in FIG. 1C. Fifth, a second clear layer 6 is formed on the first clear layer 5 on a convex portion including the vicinity of a corner edge by roll-coating a clear coating material of the second clear layer as shown in FIG. 1D. As a result, an external wall panel 1 is formed, which is made of the lower coating layer 3, the mid-coating layer 4, the first clear layer 5 and the second clear layer 6 formed on the coating surface 10 of the base panel 2 as shown in FIG. 1D. FIG. 2 shows an enlarged sectional view of a convex portion shown in the center of FIG. 1. A further ornamental design can be added by providing an ink layer 13 between a mid-coating layer 4 and an upper coating layer 5 (a first clear layer) and/or between a first clear layer 5 and a second clear layer 6 as shown in FIG. 2 by ink-jet printing, gravure printing or offset printing.

The first clear layer 5 formed over the lower coating layer 3 and the mid-coating layer 4 provides a matte appearance and a fine bumpy surface because of the beads 51. Particularly, the matte appearance is enhanced in the concave portion 12 because of a dense amount of beads formed by some of the beads running down off a slope, which provides a color difference.

A color difference is defined as numerical terms of difference between two colors, which can be obtained as follows. In the L*a*b* colorimetric system, the chromaticity diagram is defined in JIS-Z-8729 and the color difference $\Delta E^* = \{(\Delta a^*)^2 + (\Delta b^*)^2 + (\Delta L^*)^2\}^{1/2}$, where $\Delta a^*$ is a difference between two colors in the a* axis direction, $\Delta b^*$ is a difference between two colors in the b* axis direction, and $\Delta L^*$ is a difference between two colors in the L* axis direction.

The first clear layer 5 can easily enter inside the cracks, hairline cracks, blowholes and pinholes and become adhered there since the clear layer of clear resin coating material containing beads has high mobility when it is sprayed. Because of the existence of beads 51, the coating material tends to be caught at the cracks, hairline cracks, blowholes and pinholes to be piled up there. Likewise, the second clear layer is easily caught and held at the slope in the vicinity of the corner edge area by its surface tension and then hardened by drying using a dryer. This provides a raised thick film layer portion in the vicinity of the corner edge area. Applying only the first clear layer 5 cannot form a thick coating layer because of its mobility. However, when the second clear layer 6 is roll-coated, the raised thick film layer portion is formed and hardened since the coated film is pressed by the roll-coating. As a result, the corner edge area having cracks, hairline cracks, blowholes and pinholes can be covered with the hardened and layered thick film made of the first clear layer 5 and the second clear layer 6. A corner edge area of the most brittle part of the external wall panel 1 is thus protected and does not allow water to enter inside.

As described above, according to the present invention, a slope in the vicinity of a corner edge area where cracks and the like tend to be easily formed can be covered with a protecting film having excellent weather resistance under good production efficiency. Also, the slope area in the vicinity of the corner edge area of the convex portion is glossy in appearance and high in color saturation, while the joint portion is matte in appearance and low in color saturation. Thus, the slope area and the joint portion have a clearly visible difference in color saturation, which provides an external wall panel with good contrast and good three-dimensional appearance, i.e., a great improvement in the ornamental design of the panel.

COMPARISON EXAMPLE 1

First, a base panel 2 having a three-dimensional ornamental surface is prepared in the same manner as in Example 1. Second, a lower coating layer 3 is formed on the base panel 2 by spraying a coating material of the lower coating layer (sealer) all over the base panel as shown in FIG. 1A. Third, a mid-coating layer 4 is formed on the lower coating layer 3 by spraying a coating material of the mid-coating layer all over the lower coating layer as shown in FIG. 1B. Fourth, a first clear layer 5 where a large amount of beads are scattered is formed on the mid-coating layer 4 by spraying a clear coating material of the first clear layer containing a large amount of beads all over the mid-coating layer as shown in FIG. 1C. As a result, an external wall panel of which the whole surface has a matte appearance is obtained. Enlarged views of FIG. 3 and FIG. 4 show the difference between the sample of Example 1 and the sample of Comparison Example 1.

Figure 3:
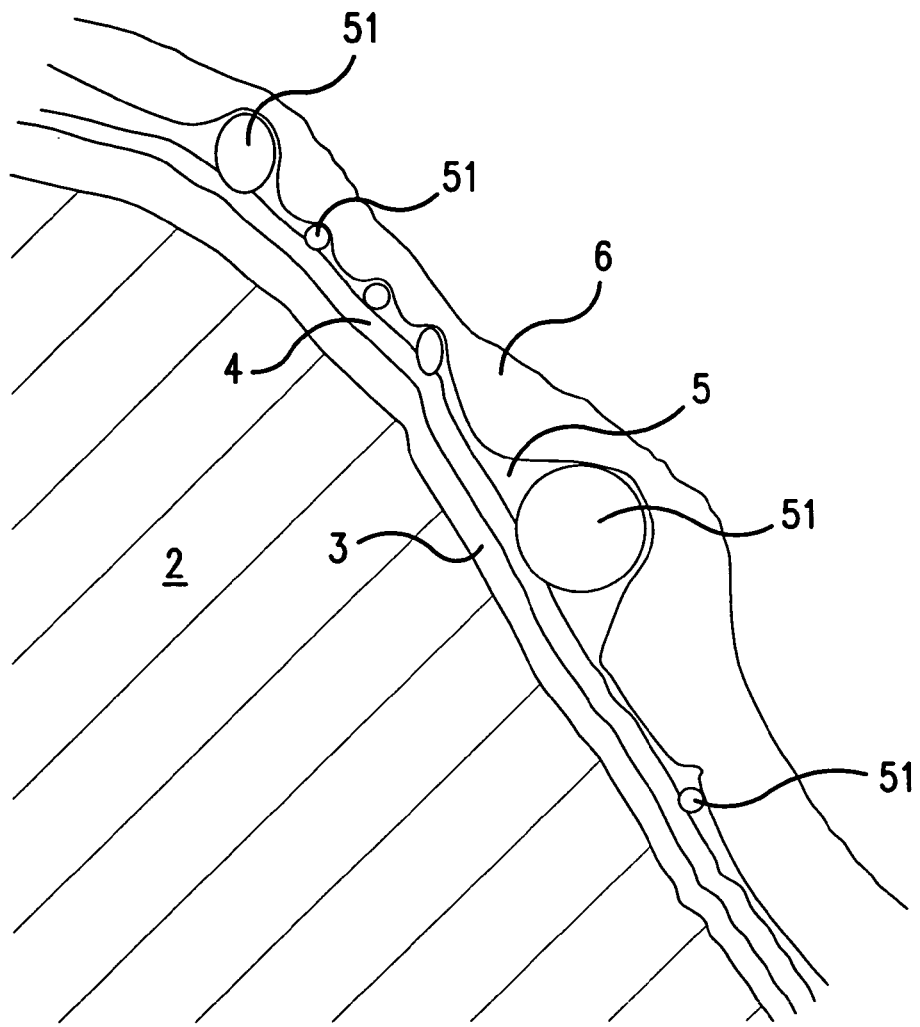
FIG. 3 is an enlarged sectional view of an external wall panel of Example 1.
Figure 4:
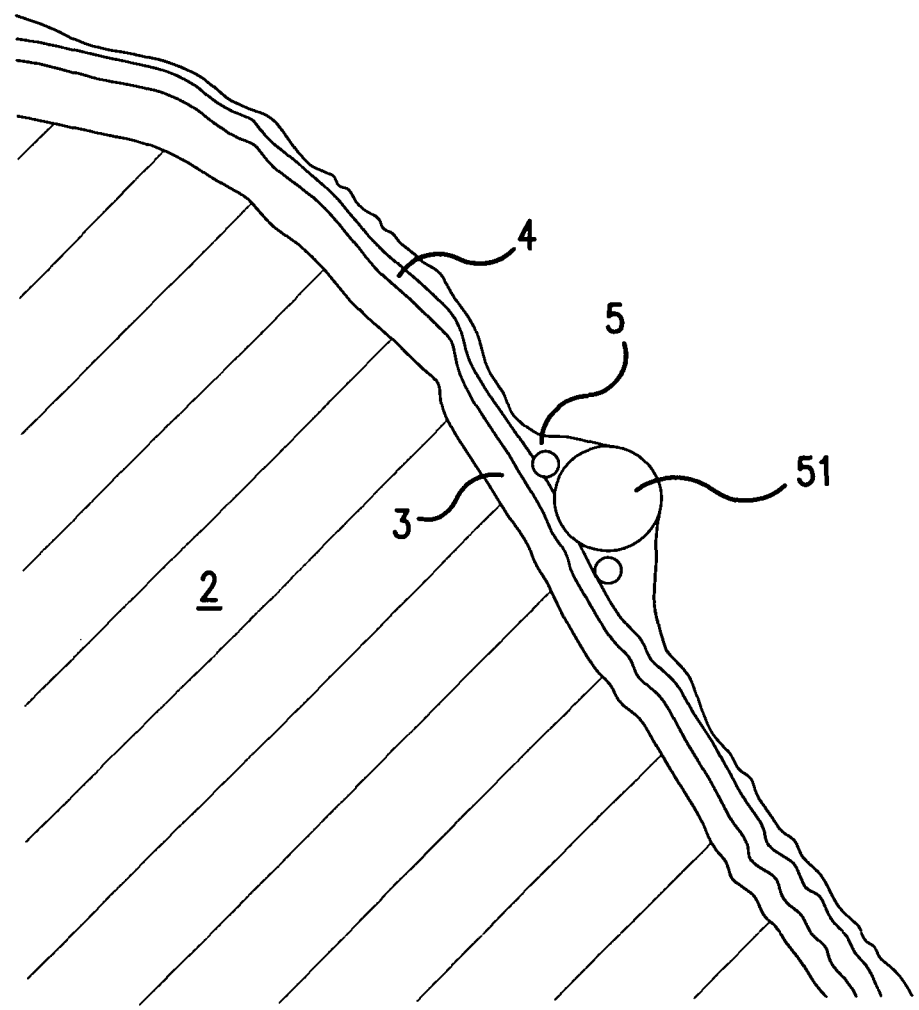
FIG. 4 is an enlarged sectional view of an external wall panel of Comparison Example 1.

The enlarged views of FIG. 3 and FIG. 4 are schematic diagrams depicting a microscopic image of test pieces enlarged 1000 times using Keyence VH-2450™, wherein the test pieces are prepared as follows. A mixture of enamel coating, hardening agent and talc in a predetermined blending ratio is applied on the surface of an external wall panel 1. The panel is left at room temperature for 48 hours so that the coating of the mixture is hardened. Then the panel is cut off to form a test piece and the test piece is polished FIG. 3 is an enlarged sectional view of a slope area of the corner edge area of Example 1 and FIG. 4 is an enlarged sectional view of Comparison Example 1 made by a conventional coating method. In FIG. 3 of Example 1, it is found that combined layers of the first clear layer 5 containing beads 51 and the transparent second clear layer 6 are formed on the slope in the vicinity of the corner edge area. In FIG. 4 of Comparison Example 1, it is found that the clear layer 5 barely covers the beads 51. Meanwhile, in FIG. 3, it is found that a thick film layer is formed and the thickness of the film is far beyond the size of beads 51. That is, it is confirmed that only applying the first clear layer 5 cannot form a thick coating layer because of its mobility, but the second clear layer 6 makes it possible to have a raised thick film layer portion by pressing the coated film using, for example, roll-coating and then hardened.

According to the present invention, the external wall panel is provided with durability and a three-dimensional appearance with good ornamental design having good contrast by creating a clearly visible color difference and color saturation difference between the convex portion and the concave portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An external wall panel consisting of:
   a base panel having a three-dimensional ornamental design surface having a convex portion and a concave portion;
   a lower coating layer formed on the surface of the base panel;
   a mid-coating layer formed on the lower coating layer;
   a first clear layer containing beads formed on the mid-coating layer; and
   a second clear layer made of a transparent layer or semi-transparent layer formed on the first clear layer in the vicinity of a corner edge of the convex portion of the three-dimensional ornamental design surface, wherein
   the first clear layer containing beads is formed over the entire surface of the mid-coating layer, and
   the second clear layer covers only the first clear layer at an upper surface of the convex portion and in the vicinity of the corner edge of the convex portion, so that the first clear layer containing beads has a matte surface, the second clear layer has a mirror finish surface, and a surface of external wall panel has a different color saturation between a surface of the first clear layer and a surface of the second clear layer.

2. The external wall panel according to claim 1, wherein the inclination angle of a slope running down from the corner edge toward the concave portion is 30 degrees or more.

3. The external wall panel according to claim 1 or 2, wherein the thickness of a thick film layer portion of the second clear layer is 10 μm or more.

4. The external wall, panel according to claim 1 or 2, wherein beads are contained in the first clear layer in an amount of 5-20 weight %.

5. The external wall panel according to claim 1 or 2, wherein the beads are 50-150 μm in diameter.

6. The external wall panel according to claim 1, wherein
   the first clear layer containing beads is formed over the entire surface of the mid-coating layer by spray-coating, and
   the second clear layer is formed by roll-coating.

7. A method of coating for an external wall panel consisting of the steps of:
   forming a lower coating layer on a base panel having a three-dimensional ornamental design surface having a convex portion and a concave portion;
   forming a mid-coating layer on the lower coating layer;
   forming a first clear layer containing beads over the entire surface of the mid-coating layer by spry-coating; and
   forming a second clear layer made of a transparent layer or semi-transparent layer on the first clear layer by roll-coating, so that i) the second clear layer covers only the first clear layer at an upper surface of the convex portion and in the vicinity of a corner edge of the convex portion, and ii) the first clear layer containing beads has a matte surface, the second clear layer has a mirror finish surface, and a surface of external wall panel has a different color saturation between surface of the first clear layer and a surface of the second clear layer.

* * * * *